United States Patent [19]
Ireton

[11] Patent Number: 5,649,138
[45] Date of Patent: Jul. 15, 1997

[54] TIME DEPENDENT REROUTING OF INSTRUCTIONS IN PLURALITY OF RESERVATION STATIONS OF A SUPERSCALAR MICROPROCESSOR

[75] Inventor: Mark A. Ireton, Austin, Tex.

[73] Assignee: Advanced Micro Devices, Sunnyvale, Calif.

[21] Appl. No.: 583,193

[22] Filed: Jan. 4, 1996

[51] Int. Cl.$^6$ .................................................. G06F 13/00
[52] U.S. Cl. ................................................... 395/393
[58] Field of Search ............................................. 395/393

[56] References Cited

U.S. PATENT DOCUMENTS

| | | | |
|---|---|---|---|
| 4,532,589 | 7/1985 | Shintani et al. | 395/393 |
| 4,626,989 | 12/1986 | Torii | 395/393 |
| 4,942,525 | 7/1990 | Shintani et al. | 395/393 |
| 5,560,025 | 9/1996 | Gupta et al. | 395/800 |

OTHER PUBLICATIONS

R. D. DeGroot (Method for prioritizing waiting arithmetic instructions) I.B.M. T.D.B. vol. 27 No. 7A Dec. 1984.

*Primary Examiner*—Parshotam S. Lall
*Assistant Examiner*—Gautam R. Patel
*Attorney, Agent, or Firm*—Conley, Rose & Tayon; B. Noel Kivlin

[57] ABSTRACT

A superscalar microprocessor is provided that includes a plurality of execution units each configured to execute the same subset of instructions. The subset of instructions may include arithmetic instructions and instructions optimized for performing DSP functionality. Instructions are routed to each of the execution units from an instruction decode unit. Each execution unit includes a plurality reservation stations for storing the instructions awaiting execution. The superscalar microprocessor advantageously includes an instruction reroute unit configured to determine whether a pending instruction within a reservation station of a particular execution unit must wait for more than a predetermined number of clock cycles before the execution unit can begin its execution. Upon detecting that a pending instruction will need to wait more than the predetermined number of clock cycles before its execution can begin, the instruction reroute unit transfers the instruction to another execution unit which is not incurring an execution bottleneck condition.

14 Claims, 2 Drawing Sheets

TIME DEPENDENT REROUTING OF INSTRUCTIONS IN PLURALITY OF RESERVATION STATIONS OF A SUPERSCALAR MICROPROCESSOR

BACKGROUND OF THE INVENTION

1. Field of the Invention

This invention is related to the field of microprocessors and, more particularly, to superscalar microprocessors including multiple execution units that are optimized for performing DSP functions.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. Memory elements (such as registers and arrays within the microprocessor) capture data values according to a clock signal which defines the clock cycle. For example, memory elements may capture their data values based upon a rising or falling edge of the clock signal.

Superscalar microprocessor manufacturers often design microprocessors according to the x86 microprocessor architecture. Due to the widespread acceptance in the computer industry of the x86 microprocessor architecture, superscalar microprocessors designed to execute x86 instructions may be suitable for use in many computer system configurations. The x86 instruction set is an example of a complex instruction set computer (CISC) instruction set. Certain CISC instructions are defined to perform complex operations which may require multiple clock cycles to complete. For example, a CISC instruction may utilize a memory operand (i.e. an operand value stored in a memory location as opposed to a register). Fetching the operand from memory may require several clock cycles prior to execution of the instruction upon the operand value. Additionally, a CISC instruction may specify several results to be stored in several different storage locations. Since execution units within a superscalar microprocessor are capable of conveying a finite number of results during a clock cycle, these several results add complexity. The number of results an instruction specifies may affect the number of clock cycles required to execute the instruction. Finally, certain mathematical X86 instructions such as divide and multiply instructions may take numerous processor clock cycles to execute, particularly if they involve memory operands.

Computer systems employing x86 microprocessors also often employ discrete digital signal processors (DSPs). The DSPs are typically included within multimedia devices such as sound cards, speech recognition cards, video capture cards, etc. The DSPs function as coprocessors, performing complex mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system and executes the application programs.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IR) filters, Fast Fourier Transforms (FFTs), matrix correlations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations.

As computer systems include more multimedia devices and capabilities, the mathematical computation performed within the computer system also increases. While computer systems have evolved to include multimedia functions, microprocessor performance has continued to increase. Still further, the number of transistors included within microprocessor designs continues to increase with continued improvements in semiconductor fabrication technology. It is desirable to integrate DSP functionality into the microprocessor to handle the increased computational demands of modern computer systems and to simplify programming.

However, as stated previously, DSP functions tend to require extensive mathematical computations. The instructions involved in these computations may each require numerous clock cycles for execution. If a general purpose superscalar microprocessor is employed to handle the DSP functionality, and particularly if the superscalar microprocessor employs distributed reservation stations, bottlenecks can occur if one of the execution units is burdened with a majority of the instructions that require numerous cycles for completion. This condition can further cause other execution units to stall.

SUMMARY OF THE INVENTION

The problems outlined above are in large part solved by a superscalar microprocessor employing a selective instruction rerouting mechanism in accordance with the present invention. In one embodiment, a superscalar microprocessor is provided that includes a plurality of execution units each configured to execute the same subset of instructions. The subset of instructions may include arithmetic instructions and instructions optimized for performing DSP functionality. Instructions are routed to each of the execution units from an instruction decode unit. Each execution unit includes a plurality of reservation stations for storing the instructions awaiting execution. The superscalar microprocessor advantageously includes an instruction reroute unit configured to determine whether a pending instruction within a reservation station of a particular execution unit must wait for more than a predetermined number of clock cycles before the execution unit can begin its execution. The number of clock cycles before the execution unit can begin execution is determined by the number of cycles remaining for a currently executing instruction to complete. The determination may further account for the number of cycles required to complete any other instructions in the reservation stations of the execution unit that are eligible for execution and that are ahead of the pending instruction with respect to the program order. Upon detecting that a pending instruction will need to wait more than the predetermined number of clock cycles before its execution can begin, referred to as an execution "bottleneck" condition, the instruction reroute logic transfers the instruction to another execution unit which is not incurring an execution bottleneck condition. In accordance, the burden upon the first execution unit is decreased, instructions may be executed more expeditiously, and stalling conditions of the second execution unit may be avoided.

Broadly speaking, the present invention contemplates a superscalar microprocessor comprising a first execution logic circuit configured to execute a predetermined set of instructions, a first reservation station unit coupled to the first execution logic circuit and configured to store a pending instruction to be executed by the first execution logic circuit, a second execution logic circuit configured to execute the predetermined set of instructions, and a second reservation station unit coupled to the second execution logic circuit. The superscalar microprocessor further includes an instruction reroute unit coupled to the first and second execution logic units and configured to reroute the pending instruction to be executed by the first logic unit to the second reservation station unit in response to the instruction reroute unit determining that the pending instruction must wait for more than a predetermined number of clock cycles before the pending instruction can begin execution within the first execution logic unit.

BRIEF DESCRIPTION OF THE DRAWINGS

Other objects and advantages of the invention will become apparent upon reading the following detailed description and upon reference to the accompanying drawings in which.

Figure 1:
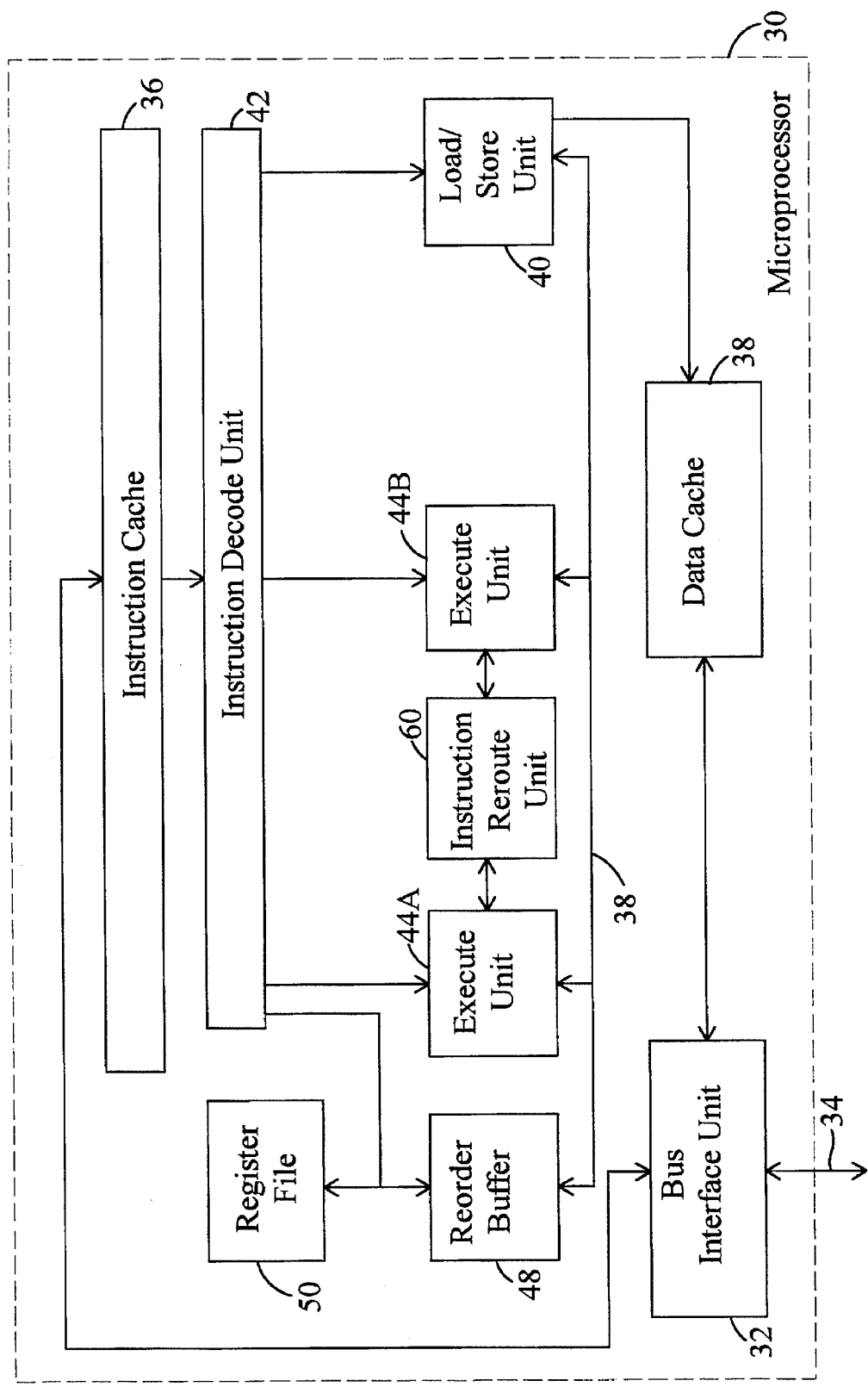
FIG. 1 is a block diagram of a superscalar microprocessor including an instruction reroute unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar microprocessor 30 is shown. Microprocessor 30 includes a bus interface unit 32 coupled to an external bus 34, an instruction cache 36, and a data cache 38. Data cache 38 is coupled to a load/store unit 40. Instruction cache 36 is coupled to an instruction decode unit 42, which is coupled to a plurality of execute units including execution units 44A and 44B (collectively referred to as execution units 44), load/store unit 40, a reorder buffer 48, and a register file 50. Execution units 44 and load/store unit 40 are also coupled to reorder buffer 48. An instruction reroute unit 60 is finally shown coupled to execution units 44.

Generally speaking, instructions are fetched from instruction cache 36 and conveyed to instruction decode unit 42 for decode, operand fetch, and dispatch. Instruction decode unit 42 decodes each instruction in order to determine which of execute units 44 or load/store unit 40 are configured to execute the instruction. Instruction decode unit 42 dispatches the instruction to a unit which is configured to execute the instruction and has resources to execute or store the instruction at the time the instruction is decoded. Additionally, register operands (i.e. operands stored in register file 50) are decoded from the instruction in order to convey operand requests to register file 50 and reorder buffer 48.

Each of the execution units 44 is configured to execute various instructions. In one embodiment, execution units 44 are symmetrical execution units. Symmetrical execution units are each configured to execute the same subset of the instruction set employed by superscalar microprocessor 30. For example, symmetrical execution units may each be configured to execute instructions within the X86 instructions set except for load/store memory operations. These instructions may include arithmetic operations, shift operations, and branch operations. In another embodiment, execution units 44 may be configured in an asymmetrical fashion, wherein certain instructions may be executed by one execution unit but not the other. At least a subset of instructions, however, may be executed by either execution unit 44, as will be explained in further detail below. It is also understood that additional execution units may be employed, such as a floating point unit or a dedicated branch unit.

For the embodiment of FIG. 1, each execution unit is further configured to execute certain defined DSP instructions. DSP instructions may include highly optimized mathematical functions. For example, a multiply and accumulate operation is a DSP function. DSPs often include a multiply and accumulate function which multiplies a pair of operands together and adds the product to a third operand. The third operand may maintain an accumulation of prior multiplications. The multiply and accumulate function is useful in many numerically intensive applications such as convolution and numerical integration. Additionally, the DSP instructions supported by microprocessor 30 may further be optimized to repetitively operate upon a large number of operands stored contiguously in a memory. For such instructions, the memory may be accessed via a pair of pointer registers and the pointer registers may be incremented or decremented concurrently.

Instruction cache 36 is configured to store a plurality of lines of instructions prior to their execution by microprocessor 30. It is noted that instruction cache 36 may be configured in a set-associative or direct-mapped configuration. Multiple instructions are fetched from instruction cache 36 and conveyed to instruction decode unit 42 during a clock cycle. In one embodiment, instruction cache 36 includes an instruction fetching mechanism which selects fetch addresses for fetching instructions. The instruction fetch mechanism may fetch instructions subsequent to those fetched in a previous clock cycle. In addition, instructions may be fetched from the predicted target of a branch instruction. A branch prediction mechanism may be included within instruction cache 36 for performing branch prediction. Any branch prediction mechanism may be used by instruction cache 36. Finally, instructions may be fetched according to a mispredicted branch instruction or an exception.

Load/store unit 40 is configured to execute load and store memory operations. Since load/store unit 40 performs load and store memory operations which access a memory address, load/store unit 40 is coupled to data cache 38. Additionally, load/store unit 40 detects memory dependencies between addresses accessed and modified by various instructions.

Execution units 44 and load/store unit 40 each include one or more reservation stations for storing dispatched instructions prior to the execution of those instructions. One or more operands for an instruction may not be available, causing a delay in executing the instruction. Additionally, the unit may execute another instruction provided to the unit in a previous clock cycle, causing a delay in executing a subsequent instruction. Instructions remain in the reservation station until operands become available, at which time the instruction becomes eligible for execution. A second instruction which is subsequent to a first instruction in program order may execute out of order with the first instruction if the second instruction receives its operands prior to the first instruction.

Microprocessor 30 supports out of order execution. Reorder buffer 48 is included to ensure that instructions are executed such that they calculate the same results as when the instructions are executed entirely in order. Reorder buffer 48 provides dependency checking, register renaming, mispredicted branch recovery, etc. When an instruction is decoded and dispatched by instruction decode unit 42, temporary storage is allocated within reorder buffer 48 for the results of the instruction. A tag identifying the storage location is assigned to the instruction. It is noted that instructions are decoded and dispatched in program order, allowing reorder buffer 48 to allocate storage locations for each instruction in program order. Reorder buffer 48 therefore tracks the original program order of instructions, regardless of the order in which the instructions are actually executed in execution units 44 and load/store unit 40. For simplicity, execution units 44 and load/store unit 40 will be collectively referred to herein as functional units.

For each instruction which utilizes register operands, a request is made by instruction decode unit 42 to reorder buffer 48 and register file 50 for the operand. If reorder buffer 48 is storing an instruction which updates the requested register, then reorder buffer 48 provides either: (1) the operand, if the operand has been produced via execution of the instruction, or (2) a tag identifying the reorder buffer location to store the operand, if the operand has not yet been produced. If reorder buffer 48 is not storing an instruction which updates the register, then the operand value is provided by register file 50. Register file 50 includes storage locations for storing the value of each register defined by the microprocessor architecture employed by microprocessor 30. It is noted that, when a functional unit transmits a result to reorder buffer 48, the tag identifying the instruction being executed is also transmitted. The result is received by reorder buffer 48 and stored in the storage location indicated by the corresponding tag. Additionally, instructions which are within functional units or reservation stations awaiting the result may detect the tag conveyed to reorder buffer 48 and capture the result as it is conveyed. This technique is often referred to as "result forwarding". It is noted that, in cases where reorder buffer 48 is storing more than one update to a particular register, the tag or value associated with the last instructions (in program order) is conveyed in response to the request.

Reorder buffer 48 retires instructions (i.e. stores the results into register file 50 and deletes the instructions) in program order. An instruction may be retired when each instruction within reorder buffer 48 which is prior to that instruction in program order has been executed and is ready for retirement. In this manner, instructions which are speculatively executed and later found to be incorrectly executed may be discarded prior to updating register file 50. For example, an instruction may be subsequent to a branch instruction. If the branch instruction is found to be mispredicted via execution of the branch instruction by a functional unit, then the subsequent instruction may be part of a code sequence which is not intended to be executed. Because the instruction has not updated register file 50, it may be discarded from reorder buffer 48 and the instruction will appear to have never executed. Instructions subsequent to an instruction which causes an exception may be handled similarly. It is noted that instructions which include a store memory access may not update register file 50, but do not perform their store memory accesses until the instructions are otherwise ready for retirement in reorder buffer 48. In one embodiment, reorder buffer 48 conveys tags of instructions including a store memory access which are ready for retirement to load/store unit 40. Load/store unit 40 then performs the corresponding store memory accesses and the instructions may be retired.

Data cache 38 is a high speed cache memory configured to store data accessed by microprocessor 30. It is noted that data cache 38 may be configured as a set-associative or direct-mapped cache.

Bus interface unit 32 is included to effect communications between microprocessor 30 and other devices within a computer system employing the microprocessor. The other devices may be coupled to external bus 34, or coupled to another device or devices which are coupled to external bus 34. In particular, instruction cache 36 communicates instruction fetch addresses which miss instruction cache 36 to bus interface unit 32. Similarly, data addresses which miss data cache 38 are conveyed to bus interface unit 32. Bus interface unit 32 is configured to communicate the addresses to a main memory upon external bus 34, and to convey the data or instructions received to data cache 38 and instruction cache 36, respectively. Still further, bus interface unit 32 receives cache lines discarded from data cache 38 which have been modified with respect to main memory. Bus interface unit 32 transfers such cache lines to main memory via external bus 34.

As will be described in greater detail below in conjunction with FIG. 2, instruction reroute unit 60 is configured to determine a latency associated with an instruction that is eligible for execution within a reservation station of a particular execution unit 44 before it can actually begin execution. More specifically, the instruction reroute unit 60 receives a signal from execution unit 44A that indicates whether the execution unit is going to take more than a predetermined number of clock cycles, such as 5 clock cycles, to complete execution of the currently executing instruction. Instruction reroute unit 60 is further configured to determine the number of clock cycles that other eligible instructions awaiting execution within the reservation station unit will take before they can begin and ultimately complete execution. If an instruction eligible for execution within the reservation station unit of execution unit 44A must wait longer than a predetermined number of clock cycles before its execution can begin, the instruction reroute unit 60 advantageously reroutes the instruction to execution unit 44B, provided that the instructions executing or awaiting execution within execution unit 44B will not take greater than a predetermined number of cycles to complete execution. Instruction reroute unit 60 is similarly configured to reroute instructions from the reservation stations of execution unit 44B to execution unit 44A.

Figure 2:
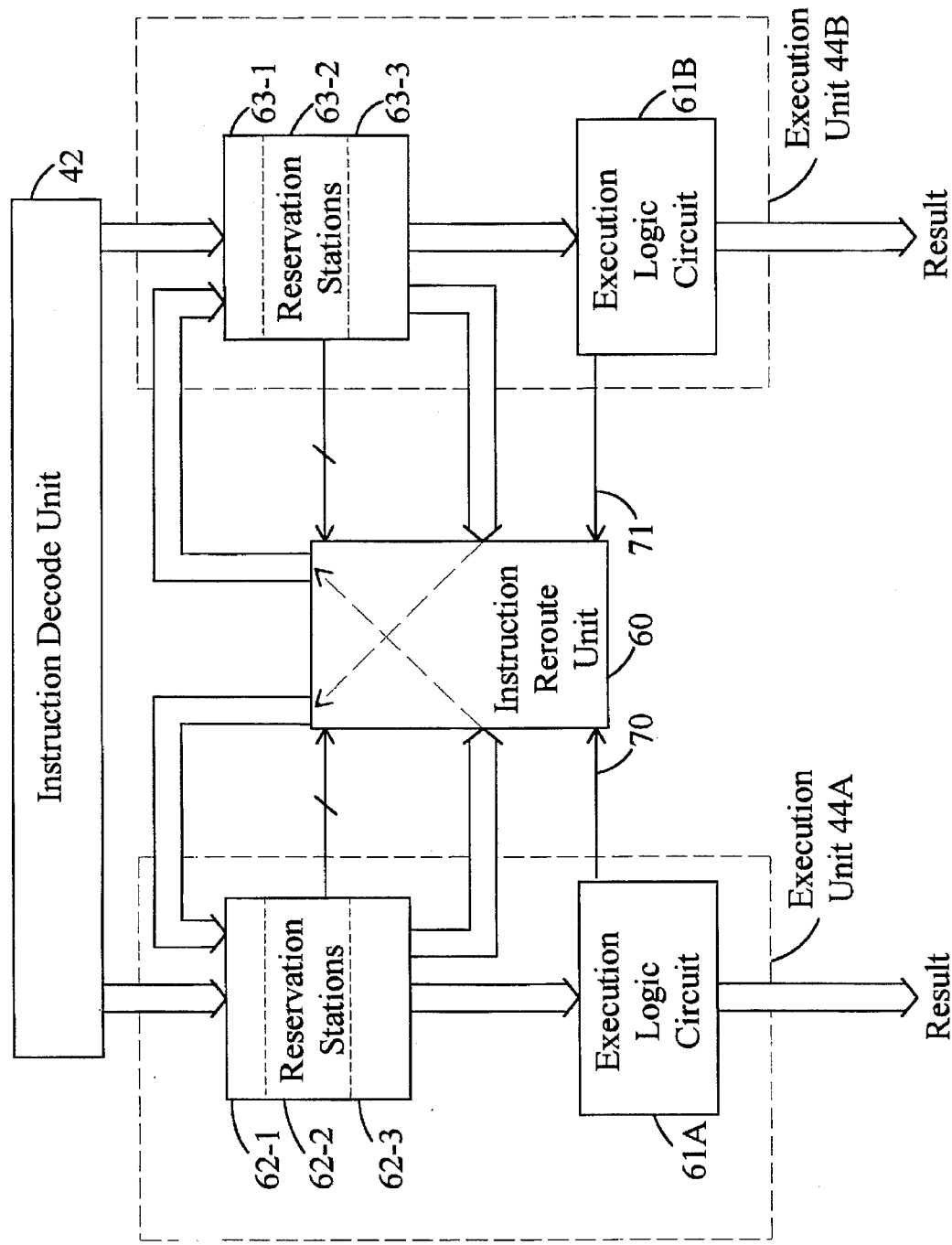
FIG. 2 is a block diagram illustrating more detailed portions of the superscalar microprocessor of FIG. 1.

Turning next to FIG. 2, a block diagram is shown that illustrates further details of the microprocessor 30 of FIG. 1. Circuit portions that correspond to those of FIG. 1 are numbered identically for simplicity and clarity.

In the illustrated configuration of FIG. 2, execution unit 44A includes execution logic circuit 61A and a group of reservation stations 62-1 through 62-3 (referred to collectively as reservation station unit 62). Execution unit 44B similarly includes execution logic circuit 61B and reservation stations 63-1 through 63-3 (referred to collectively as reservation station unit 63).

Execution logic circuit 61A may be configured to execute the same set of instructions as execution logic circuit 61B or may be configured to execute a subset of instructions that are executable by execution logic 61B, and vice versa. Instruction decode unit 42 decodes the instructions and dispatches the decoded instructions to either execution unit 44A or execution unit 44B, depending on the type of instruction (if the instruction is executable by only one of the units) and based upon the availability of empty entries within the associated reservation stations (if the instruction is executable by either of the units 44A and 44B). Once an instruction has been stored within one of the reservation station units 62 or 63, the instruction will become eligible for execution when the instruction's operands are available. Upon eligibility, the instruction along with its operands are passed to the corresponding execution logic circuit 61. It is noted that the reservation stations associated with each execution unit 44 may be configured to provide instructions to the execution logic 61A in order, or may be configured to provide any eligible instruction to the associated execution logic circuit 61.

During operation, instruction reroute unit 60 receives a signal from execution logic 61A at line 70 indicative of whether the current instruction being executed by execution logic unit 61A will take more than a predetermined number of clock cycles before completion. In one embodiment, the predetermined number of clock cycles is five (i.e., execution logic circuit 61A drives line 70 high if a currently executing instruction unit will take more than five clock cycles before completion). Instruction reroute 60 receives a similar signal from execution logic unit 61B at line 71.

For the embodiment of FIG. 2, an eligible instruction within any of the reservation stations of reservation station unit 62 may be provided to execution logic unit 61A, even though earlier instructions (in program order) are waiting for operands. If more than one instruction within the reservation stations unit 62 are eligible for conveyance to execution logic circuit 61A upon a particular clock cycle, the oldest instruction is provided to the execution logic unit 61A (i.e., upon completion of a previously executing instruction within the execution logic unit 61A). For example, if an instruction pending within reservation station 62-1 is eligible for execution and earlier dispatched instructions within reservation stations 62-2 and 62-3 are still waiting their operands, the instruction within reservation station unit 62-1 is conveyed to execution logic circuit 61A immediately after a previously executing instruction within the execution logic circuit 61A completes. If an instruction within reservation station 62-1 and an instruction within reservation station 62-3 are eligible for execution, the earlier-dispatched instruction will be provided to execution logic circuit 61A upon completion of the previously executing instruction.

In addition to the signal at line 70 generated by execution logic circuit 61a and indicative of the number of clock cycles before completion of a currently executing instruction within execution logic circuit 61A, instruction reroute unit 60 also receives information regarding the instructions pending within reservation stations unit 62. Using this information, instruction reroute unit 60 is configured to determine whether, for an instruction which is eligible for execution within reservation station unit 62, the number of clock cycles before it can actually begin execution exceeds a certain number. This determination is based upon the number of clock cycles required to complete the currently executing instruction in execution logic circuit 61A and any other eligible instructions in the reservation station unit 62 awaiting conveyance to the execution unit. If the number of cycles before execution of the eligible instruction can begin exceeds a predetermined threshold, and if the number of cycles required to complete execution of a currently executing instruction within execution logic circuit 61B and to execute any other eligible instructions within reservation stations unit 63 does not exceed a second predetermined threshold, the eligible instruction within the reservation stations unit 62 of execution unit 44A is rerouted through instruction reroute unit 62 to an available reservation station of execution unit 44B.

For example, consider a situation wherein an eligible instruction within reservation station 62-1 must wait for other earlier-dispatched eligible instructions within reservation stations 62-2 and 62-3 before it can begin execution. The eligible instruction within reservation station 62-1 must further wait for the currently executing instruction within execution logic circuit 61A to complete. In this situation, if the instruction reroute unit 60 determines that the number of clock cycles required to complete the execution of the currently executing instruction within execution logic circuit 61A and the number of clock cycles to execute the instructions within reservation stations 62-2 and 62-3 will take more than a predetermined threshold number of clock cycles, the instruction reroute unit 60 will transfer the eligible instruction within reservation station 62-1 to execution unit 44B, provided that there is an available reservation station within reservation station unit 63, and provided that the currently executing instruction within the execution logic circuit 61B and any earlier-dispatched, eligible instructions within reservation stations unit 63 does not exceed a second predetermined threshold. Similar transfers may be effectuated for instructions within reservation stations 62-2 and 62-3, preferably in program order. Typically, the first predetermined threshold (to qualify an eligible instruction for transfer to another execution unit) is greater than the second predetermined threshold which is used as an condition to prevent the transfer of an instruction. Additionally, if all instructions within the reservation stations of reservation station unit 63 are awaiting operands, an eligible instruction in reservation station unit 62 may be transferred by instruction reroute unit 60 and provided directly to execution logic circuit 61B for execution in the next clock cycle.

Since the instruction reroute unit 60 serves to transfer eligible instructions from a heavily-burdened execution unit to an execution unit which is not as heavily burdened, stalling conditions within the microprocessor 30 may be avoided and instructions may be executed more expeditiously. Accordingly, the overall performance of microprocessor 30 may be improved.

Numerous variations and modifications will become apparent to those skilled in the art once the above disclosure is fully appreciated. It is intended that the following claims be interpreted to embrace all such variations and modifications.

What is claimed is:

1. A superscalar microprocessor comprising:

a first execution logic circuit configured to execute a predetermined set of instructions;

a first reservation station unit coupled to said first execution logic circuit and configured to store a pending instruction to be executed by said first execution logic circuit;

a second execution logic circuit configured to execute said predetermined set of instructions;

a second reservation station unit coupled to said second execution logic circuit; and an instruction reroute unit coupled to said first and second execution logic units and to said first and second reservation station units and configured to reroute said pending instruction to be executed by said first logic unit to said second reservation station unit in response to said instruction reroute unit determining that said pending instruction must wait for more than a predetermined number of clock cycles before said pending instruction can begin execution within said first execution logic unit.

2. The superscalar microprocessor as recited in claim 1 wherein said first execution logic circuit is configured to generate a signal indicative of a number of clock cycles before completion of a currently executing instruction.

3. The superscalar microprocessor as recited in claim 2 wherein said signal generated by said first execution logic circuit is provided to said instruction reroute unit.

4. The superscalar microprocessor as recited in claim 3 wherein said instruction reroute unit is configured to determine that said pending instruction must wait for more than said predetermined number of clock cycles based upon said signal generated by said first execution logic circuit.

5. The superscalar microprocessor as recited in claim 4 wherein said instruction reroute unit is further configured to determine that said pending instruction must wait for more than said predetermined number of clock cycles based upon a minimum number of clock cycles to execute other eligible instructions stored within said first reservation station unit.

6. The superscalar microprocessor as recited in claim 5 wherein said other eligible instructions are ahead of said pending instruction with respect to program order.

7. The superscalar microprocessor as recited in claim 1 wherein said instruction reroute unit is further configured to determine a number of clock cycles before said pending instruction can be executed by said second execution logic circuit.

8. A superscalar microprocessor comprising:

a first execution logic circuit configured to execute a predetermined set of instructions;

a first reservation station unit coupled to said first execution logic circuit and configured to store a pending instruction to be executed by said first execution logic circuit;

a second execution logic circuit configured to execute said predetermined set of instructions;

a second reservation station unit coupled to said second execution logic circuit; and an instruction reroute unit coupled to said first and second execution logic units and to said first and second reservation station units and configured to determine whether said pending instruction must wait for more than a predetermined number of clock cycles before said pending instruction can begin execution within said first execution logic unit and configured to reroute said pending instruction to said second reservation station in response to said instruction reroute unit determining that said pending instruction must wait for more than said predetermined number of clock cycles before said pending instruction can begin execution within said first execution logic unit.

9. The superscalar microprocessor as recited in claim 8 wherein said first execution logic circuit is configured to generate a signal indicative of a number of clock cycles before completion of a currently executing instruction.

10. The superscalar microprocessor as recited in claim 9 wherein said signal generated by said first execution logic circuit is provided to said instruction reroute unit.

11. The superscalar microprocessor as recited in claim 10 wherein said instruction reroute unit is configured to determine that said pending instruction must wait for more than said predetermined minimum number of clock cycles based upon said signal generated by said first execution logic circuit.

12. The superscalar microprocessor as recited in claim 11 wherein said instruction reroute unit is further configured to determine that said pending instruction must wait for more than said predetermined number of clock cycles based upon a number of clock cycles to execute other eligible instructions stored within said first reservation station unit.

13. The superscalar microprocessor as recited in claim 12 wherein said other eligible instructions are ahead of said pending instruction with respect to program order.

14. The superscalar microprocessor as recited in claim 8 wherein said instruction reroute unit is further configured to determine a number of clock cycles before said pending instruction can be executed by said second execution logic circuit.

* * * * *